(12) United States Patent
Lee et al.

(10) Patent No.: US 9,785,718 B2
(45) Date of Patent: Oct. 10, 2017

(54) SYSTEM AND METHOD FOR PROVIDING LOCATION-SENSITIVE AUTO-COMPLETE QUERY

(71) Applicant: NHN CORPORATION, Seongnam-si (KR)

(72) Inventors: SeungJun Lee, Seongnam-si (KR); Taeil Kim, Seongnam-si (KR)

(73) Assignee: NHN Corporation, Gyeonggi-do (KR)

( * ) Notice: Subject to any disclaimer, the term of this patent is extended or adjusted under 35 U.S.C. 154(b) by 212 days.

(21) Appl. No.: 14/226,067

(22) Filed: Mar. 26, 2014

(65) Prior Publication Data

US 2014/0207789 A1   Jul. 24, 2014

Related U.S. Application Data

(63) Continuation-in-part of application No. 13/552,204, filed on Jul. 18, 2012, now abandoned.

(30) Foreign Application Priority Data

Jul. 22, 2011 (KR) ........................ 10-2011-0072791

(51) Int. Cl.
   *G06F 17/30* (2006.01)
(52) U.S. Cl.
   CPC ...... *G06F 17/3087* (2013.01); *G06F 17/3097* (2013.01)
(58) Field of Classification Search
   CPC ........................ G06F 17/3087; G06F 17/3097
   See application file for complete search history.

(56) References Cited

U.S. PATENT DOCUMENTS 6,269,361 B1   7/2001   Davis et al.
6,564,213 B1   5/2003   Ortega et al.
(Continued)

FOREIGN PATENT DOCUMENTS

JP   S63-316124 A   12/1988
JP   2000-010991 A   1/2000
(Continued)

OTHER PUBLICATIONS

Parasuraman, et al. "A Model for Types and Levels of Human Interaction with Automation", 2000, IEEE Transactions on Systems, Man, and Cybernetics, vol. 30, pp. 286-297.
(Continued)

*Primary Examiner* — Etienne Leroux
*Assistant Examiner* — Jared Bibbee
(74) *Attorney, Agent, or Firm* — Harness, Dickey & Pierce, P.L.C.

(57) ABSTRACT

A system for providing an auto-complete query to a user terminal includes a query indexing unit configured to index search queries. Each of the search queries is associated with location information. The indexing includes incorporating the location information into an associated one of the search queries. At least one of the search queries being a previously provided auto-complete query. The system includes a keyword generating unit configured to generate a keyword by incorporating location information associated with the user terminal into a query inputted by the user terminal. The system includes a query providing unit configured to determine that at least one of the indexed search queries corresponds to the generated keyword, and provide, to the user terminal, the determined at least one of the indexed search queries as the auto-complete query.

20 Claims, 6 Drawing Sheets

(56) References Cited

U.S. PATENT DOCUMENTS

| | | | |
|---|---|---|---|
| 6,920,450 B2 | 7/2005 | Aono et al. | |
| 7,774,003 B1 | 8/2010 | Ortega et al. | |
| 8,484,190 B1* | 7/2013 | Igarashi | G06F 17/30864 707/707 |
| 8,549,018 B1* | 10/2013 | Cooley | G06F 17/30867 707/754 |
| 2007/0050352 A1* | 3/2007 | Kim | G06F 17/2223 |
| 2008/0005076 A1* | 1/2008 | Payne | G06F 17/30964 |
| 2009/0089280 A1 | 4/2009 | Raghunathan | |
| 2009/0094145 A1* | 4/2009 | Kim | G06Q 30/04 705/34 |
| 2009/0249198 A1 | 10/2009 | Davis et al. | |
| 2011/0173174 A1* | 7/2011 | Flitcroft | G06F 17/30864 707/707 |
| 2013/0041878 A1* | 2/2013 | Satyanarayana | G06F 17/3097 707/706 |

FOREIGN PATENT DOCUMENTS

| | | |
|---|---|---|
| JP | 2003-150601 A | 5/2003 |
| JP | 2006-127509 A | 5/2006 |
| JP | 2009-532797 A | 9/2009 |
| JP | 2010-198281 A | 9/2010 |
| KR | 2005-0040852 A | 11/2006 |
| KR | 10-0895492 B1 | 5/2009 |
| KR | 2009-0125376 A | 12/2009 |

OTHER PUBLICATIONS

Japanese Office Action dated Jan. 26, 2016 in corresponding application No. 2012-160704.

Tatsuya Fujisaka et al., "A Query Generation Support System with Local Characteristic Words for Location-aware Web Searches", Japan, May 9, 2009, vol. 2009, No. il-32, pp. 1-6.

* cited by examiner

FIG.4

| REGION CODE | GRAPHEME UNIT | QUERY | SEARCH FREQUENCY |
|---|---|---|---|
| 01 | a | apple | 10,000/DAY |
| | | area | 8,000/DAY |
| | | .... | .... |
| | b | background | 50,000/DAY |
| | | benefit | 13,000/DAY |
| | | .... | .... |
| | .... | .... | .... |
| 02 | a | aerobic | 9,000/DAY |
| .... | .... | .... | .... |

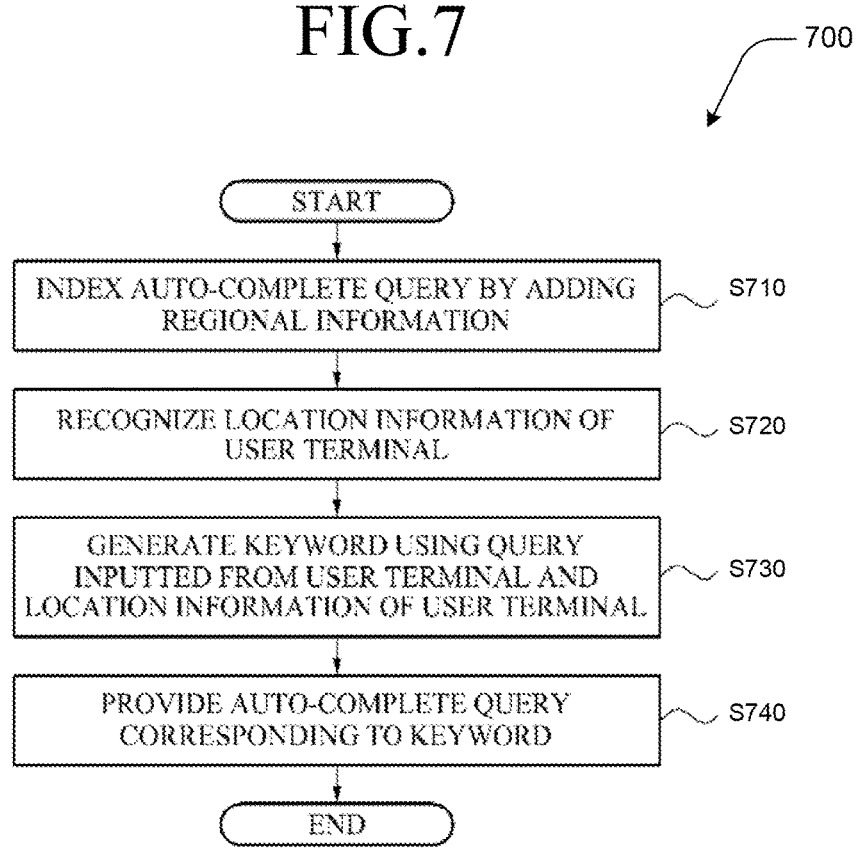

SYSTEM AND METHOD FOR PROVIDING LOCATION-SENSITIVE AUTO-COMPLETE QUERY

CROSS-REFERENCE TO RELATED APPLICATIONS

This application claims priority from and the benefit of Korean Patent Application No. 10-2011-0072791, filed on Jul. 22, 2011, which is hereby incorporated by reference in its entirety for all purposes as if fully set forth herein. This application is a continuation-in-part under 35 U.S.C. §120 of U.S. patent application Ser. No. 13/552,204, filed on Jul. 18, 2012, which is hereby incorporated by reference in its entirety for all purposes as if fully set forth herein.

BACKGROUND

Field

Example embodiments relate to a system and method for providing a location-sensitive auto-complete query in response to a user's search query.

Discussion of the Background

Generally, a search website and/or a search engine provides a search service by providing a user with a search result in response to a search query inputted by the user. The user's search query may include one or more search terms. The search results may include, one or more websites including the search query, an article including the search query, an image with a file name including the search query, and the like.

Currently, research is being made to develop a search service to provide a user with a satisfactory search result even when the user inputs an improper or insufficient query, as well as when the user inputs a proper query, in order to enhance user convenience.

Reference is made herein to Korean Patent Application No. 10-2005-0040852, which has matured to registration, entitled a "system and method for providing an auto-complete query and computer readable recording medium recording program for implementing the method" in which an auto-complete query may be provided by suggesting a query suitable for a query input condition of a user in real time to prevent the user from misspelling a query for which a search is to be conducted.

When an auto-complete query is provided according to the foregoing method, a satisfactory auto-complete query may be generally provided to a user, but when the user intends to find a result for a desired query based on a location, for example, when the user intends to find restaurant information or shopping mall information for a region in which the user is located, there is a need for providing a location-sensitive auto-complete query based on the user's location, to better serve the user's need.

However, in order to provide a location-sensitive auto-complete query, a system for a location-sensitive auto-complete query is needed.

The above information disclosed in this Background section is only for enhancement of understanding of the background of the invention, and therefore, it may contain information that does not form any part of the prior art nor what the prior art may suggest to a person of ordinary skill in the art.

SUMMARY

Example embodiments relate to a system and method for providing a location-sensitive auto-complete query that may provide a location-based auto-complete query to a user terminal based on the user terminal's location.

According to an example embodiment, a system for providing an auto-complete query to a user terminal is provided. The system includes a processor. The processor includes a query indexing unit configured to index search queries. Each of the search queries is associated with location information. The indexing includes incorporating the location information into an associated one of the search queries. At least one of the search queries being a previously provided auto-complete query. The processor includes a keyword generating unit configured to generate a keyword by incorporating location information associated with the user terminal into a query inputted by the user terminal. The processor includes a query providing unit configured to determine that at least one of the indexed search queries corresponds to the generated keyword, and provide, to the user terminal, the determined at least one of the indexed search queries as the auto-complete query.

Example embodiments provide that the location information associated with the user terminal includes at least one of user inputted location information and automatically generated location information.

Example embodiments provide that the user inputted location information includes at least one of user inputted browser information associated with a web browser installed on the user terminal, social networking information associated with a social networking application installed on the user terminal, and system information associated with a device type of the user terminal. Example embodiments provide that the automatically generated location information includes at least one of a GPS coordinate, automatically generated browser information, an IP address, a Wi-Fi, a Bluetooth MAC address, a radio-frequency identification ("RFID"), Wi-Fi connection location, and a GSM/CDMA cell ID.

Example embodiments provide the query indexing unit is further configured to index the provided auto-complete query when the user terminal submits the provided auto-complete query as a search query by incorporating location information associated with a current position of the user terminal into the provided auto-complete query.

Example embodiments provide that the location information is associated with a region code, and in the indexing, the query indexing unit is configured to determine a region code for each of the search queries, and incorporate the determined region code into each of the search queries.

Example embodiments provide that the keyword generating unit is configured to generate the keyword by incorporating a region code corresponding to the location information associated with a current position of the user terminal into the query inputted query by the user terminal.

Example embodiments provide that the region code represents at least one of a physical region and a demographic region. The physical region may be an area defined by at least one of a geographic boundary and a political boundary. The demographic region may be an area defined according to at least one demographic.

Example embodiments provide that the query providing unit is further configured to provide the determined at least one of the indexed search queries as the auto-complete query based on at least one priority Example embodiments provide that the at least one priority may include at least one of a search frequency of the determined at least one of the indexed search queries, a bidding amount associated with the determined at least one of the indexed search queries, a proximity to a desired location of the determined at least one of the indexed search queries, and a time of day that the determined at least one of the indexed search queries was submitted as a search query.

An example embodiment discloses a system for providing an auto-complete query for a query inputted by a user, the system including at least one processor; a memory to store at least one program configured to be executed by the at least one processor; a keyword generating unit to generate a keyword based on the query inputted from a user terminal and location information received from the user terminal; and a query providing unit to provide an auto-complete query corresponding to the generated keyword among the auto-complete queries indexed according to location information.

According to another example embodiment, a method for providing an auto-complete query to a user terminal in response to a query inputted by the user terminal is provided. The method includes indexing search queries. Each of the search queries may be associated with location information. The indexing includes incorporating the location information into an associated one of the search queries. At least one of the search queries being a previously provided auto-complete query. The method includes generating a keyword by incorporating location information associated with the user terminal into a query inputted by the user terminal. The method includes determining that at least one of the indexed search queries corresponds to the generated keyword. The method includes providing the determined at least one of the indexed search queries as the auto-complete query.

Example embodiments provide that the location information associated with the user terminal includes at least one of user inputted location information and automatically generated location information.

Example embodiments provide that the user inputted location information includes at least one of user inputted browser information associated with a web browser installed on the user terminal, social networking information associated with a social networking application installed on the user terminal, and system information associated with a device type of the user terminal. Example embodiments provide that the automatically generated location information includes at least one of a GPS coordinate, automatically generated browser information, an IP address, a Wi-Fi, a Bluetooth MAC address, a radio-frequency identification ("RFID"), Wi-Fi connection location, and a GSM/CDMA cell ID.

Example embodiments provide that the indexing includes indexing the provided auto-complete query when the user terminal submits the provided auto-complete query as a search query by incorporating location information associated with a current position of the user terminal into the provided auto-complete query.

Example embodiments provide that the location information is associated with a region code, and the indexing includes determining a region code for each of the search queries, and incorporating the determined region code into each of the search queries.

Example embodiments provide that the generating includes generating the keyword by incorporating a region code corresponding to the location information associated with a current position of the user terminal into the query inputted query by the user terminal.

Example embodiments provide that the region code represents at least one of a physical region and a demographic region. The physical region may be an area defined by at least one of a geographic boundary and a political boundary. The demographic region may be an area defined according to at least one demographic.

Example embodiments provide that the providing includes providing the determined at least one of the indexed search queries as the auto-complete query based on at least one priority.

Example embodiments provide that the at least one priority includes at least one of a search frequency of the determined at least one of the indexed search queries, a bidding amount associated with the determined at least one of the indexed search queries, a proximity to a desired location of the determined at least one of the indexed search queries, and a time of day that the determined at least one of the indexed search queries was submitted as a search query.

According to another example embodiment, a non-transitory computer-readable medium includes program code for providing an auto-complete query to a user terminal in response to a query inputted by the user terminal. The program code, when executed by a processor, performs a function of indexing search queries. Each of the search queries may be associated with location information. The indexing includes incorporating the location information into an associated one of the search queries. At least one of the search queries may be a previously provided auto-complete query. The program code, when executed by a processor, performs a function of generating a keyword by incorporating location information associated with the user terminal into a query inputted by the user terminal. The program code, when executed by a processor, performs a function of determining that at least one of the indexed search queries corresponds to the generated keyword. The program code, when executed by a processor, performs a function of providing the determined at least one of the indexed search queries as the auto-complete query.

It is to be understood that both the foregoing general description and the following detailed description are example embodiments, which are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate example embodiments of the invention, and together with the description serve to explain the principles of the invention.

FIG. 4 is a diagram illustrating examples of auto-complete queries indexed by a system for providing a location-sensitive auto-complete query according to an example embodiment.

FIG. 7 is a flowchart illustrating a method for providing a location-sensitive auto-complete query according to an example embodiment.

DETAILED DESCRIPTION OF THE EMBODIMENTS

Figure 1:
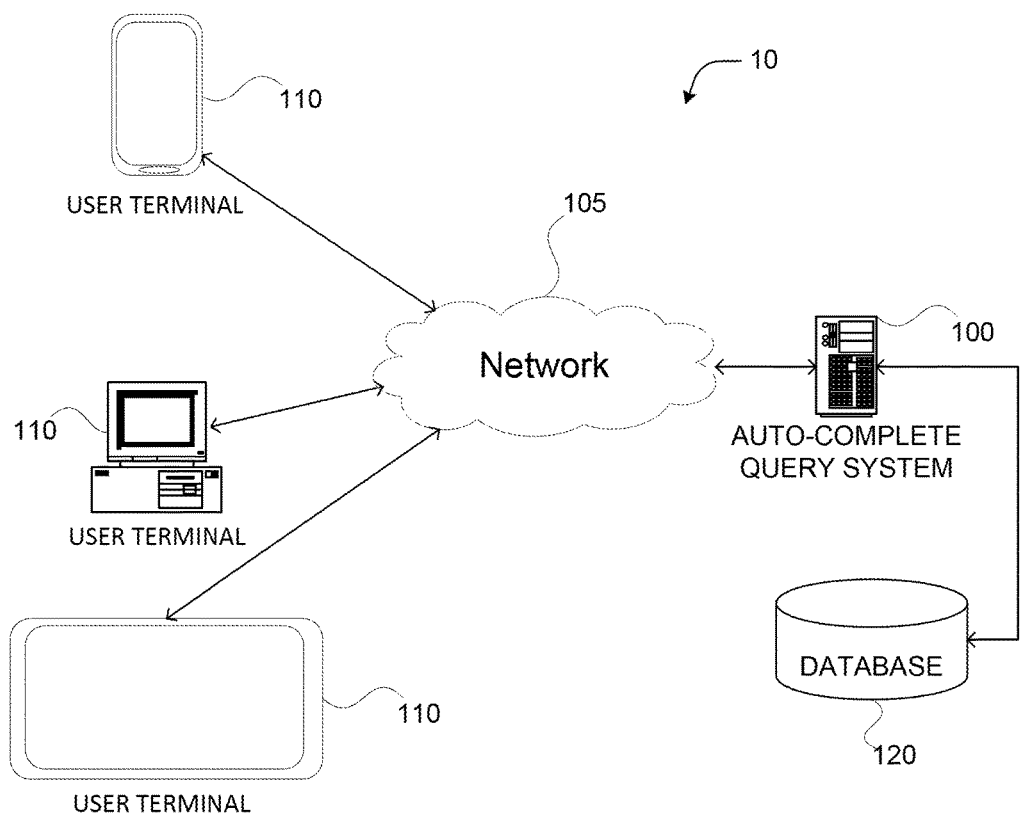
FIG. 1 illustrates an example of a communications network according to an example embodiment.

The example embodiments are described more fully hereinafter with reference to the accompanying drawings, in which example embodiments are shown. The example embodiments may, however, be embodied in many different forms and should not be construed as limited to the example embodiments set forth herein. Rather, these example embodiments are provided so that this disclosure is thorough, and will fully convey the scope of the invention to those skilled in the art. In the drawings, the size and relative sizes of layers and regions may be exaggerated for clarity. In the drawings, like numbers refer to the same or similar functionality throughout the several views. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that when an element is referred to as being "connected to" another element, it can be directly connected to the other element, or intervening elements may be present.

FIG. 1 illustrates an example of a communications network, according to an example embodiment. A communications network 10 includes user terminals 110, auto-complete query system 100, database 120, and network 105.

According to various embodiments, user terminals 110 may be hardware computing devices capable of communicating with one or more network devices (e.g., auto-complete query system 100), such that each of the user terminals 110 are able to receive services from the one or more network devices. User terminals 110 may include memory, one or more processors, and transceiver. User terminals 110 may be configured to send/receive data to/from network devices, such as a router, switch, or other like network devices, via a wired or wireless connection. User terminals 110 may be designed to sequentially and automatically carry out a sequence of arithmetic or logical operations; equipped to record/store digital data on a machine readable medium; and transmit and receive digital data via one or more network devices. In various embodiments, user terminals 110 may include laptops, desktop personal computers (PCs), tablet PCs, mobile terminals (e.g., mobile cellular phones, "smartphones", and the like), video cameras, digital photo cameras, MP3 players, wearable computing devices and/or body borne devices, and/or any other physical or logical device capable of capturing/recording, storing, and/or transferring data via network 105. User terminals 110 may include a wireless transceiver configured to operate in accordance with wireless communications standard. User terminals 110 may be configured to provide search queries to auto-complete query system 100 in order to receive auto-complete query services.

User terminals 110 may be equipped with location (or alternatively "geolocation"), positioning, and/or navigation circuitry, such as a Global Positioning System ("GPS") receiver, as well as software to convert the received signals into a location and/or position (within some margin of error). In other embodiments, alternate positioning systems may be employed, such as wireless network signal-strength-based indoor positioning systems, hybrid systems combining global and local positioning systems, and/or other like positioning and/or location detection systems. However, in various embodiments, geolocation information may come from other sources including an IP address, Wi-Fi and/or Bluetooth MAC address, radio-frequency identification ("RFID"), Wi-Fi connection location, GSM/CDMA cell IDs, and the like. According to various embodiments, user terminals 110 may be configured to provide location information to auto-complete query system 100 in order to receive auto-complete query services.

According to various embodiments, the auto-complete query system 100 may include a one or more physical computer hardware systems that are configured to provide services for client devices (e.g., user terminals 110) connected to a network (e.g., network 105). In various embodiments, the auto-complete query system 100 may be one or more servers or other like network entities that respond to network requests in order to provide network services, such as auto-complete query services, search results services, and the like. The auto-complete query system 100 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). Auto-complete query system 100 may be configured to establish, manage, and terminate communications sessions, for example between the auto-complete query system 100 and one or more of the user terminals 110. Auto-complete query system 100 may also be configured to establish, manage, and terminate communications sessions with two or more client devices.

In various embodiments, auto-complete query system 100 may provide auto-complete query services to one or more client devices (e.g., user terminals 110). In various embodiments, auto-complete query system 100 may perform the functions of search results provider, such as a search engine. In such embodiments, an a search results page may be provided by auto-complete query system 100 to one or more client devices (e.g., user terminals 110) in response to a search query inputted by a user via the one or more client devices (e.g., user terminals 110). In some embodiments, a third-party search engine and/or other like search result data provider (not shown) may provide auto-complete query system 100 with search results and/or other like data related to an inputted search query for the auto-complete query services.

According to various embodiments, auto-complete query system 100 is connected to one or more local and/or remote database 120. In various embodiments, database 120 may include a database management system ("DBMS"). Database 120 may include a relational database management system ("RDBMS") database. In other embodiments, alternate DBMS may also be used, such as an object database ("ODBMS"), column-oriented DBMS, correlation database DBMS, and the like. In various embodiments, database 120 may collect and/or store auto-complete query and/or location-based data for auto-complete query services. Additionally, database 120 may be configured to receive, from the auto-complete query system 100, location information and/or search query information of one or more of the user terminals 110 and provide location-based auto-complete query data to the auto-complete query system 100 according to the received search query.

According to various embodiments, database 120 may be stored on or otherwise associated with one or more data storage devices. These data storage devices may include at least one of a primary storage device, a secondary storage device, a tertiary storage device, a non-linear storage device, and/or other like data storage devices. Furthermore, database 120 may include one or more virtual machines, such that the physical data storage devices containing database 120 may be logically divided into multiple virtual data storage devices and/or databases. Alternatively, the databases 120 may reside on one physical hardware data storage device.

In various embodiments, network 105 may be the Internet. In other embodiments, network 105 may be may be a Wide Area Network (WAN) or other like network that covers a broad area, such as a personal area network (PAN), local area network (LAN), campus area network (CAN), metropolitan area network (MAN), a virtual local area network, or other like networks capable of physically or logically connecting computers.

As shown in FIG. 1, three user terminals 110, a single auto-complete query system 100, and a single database 120 are present. According to various embodiments, any number of client devices (e.g., user terminals 110), multiple servers (e.g., auto-complete query system 100), and/or multiple databases (e.g., database 120) may be present. Additionally, in some embodiments, auto-complete query system 100 and database 120 may be virtual machines, and/or they may be provided as part of a cloud computing service.

Figure 2:
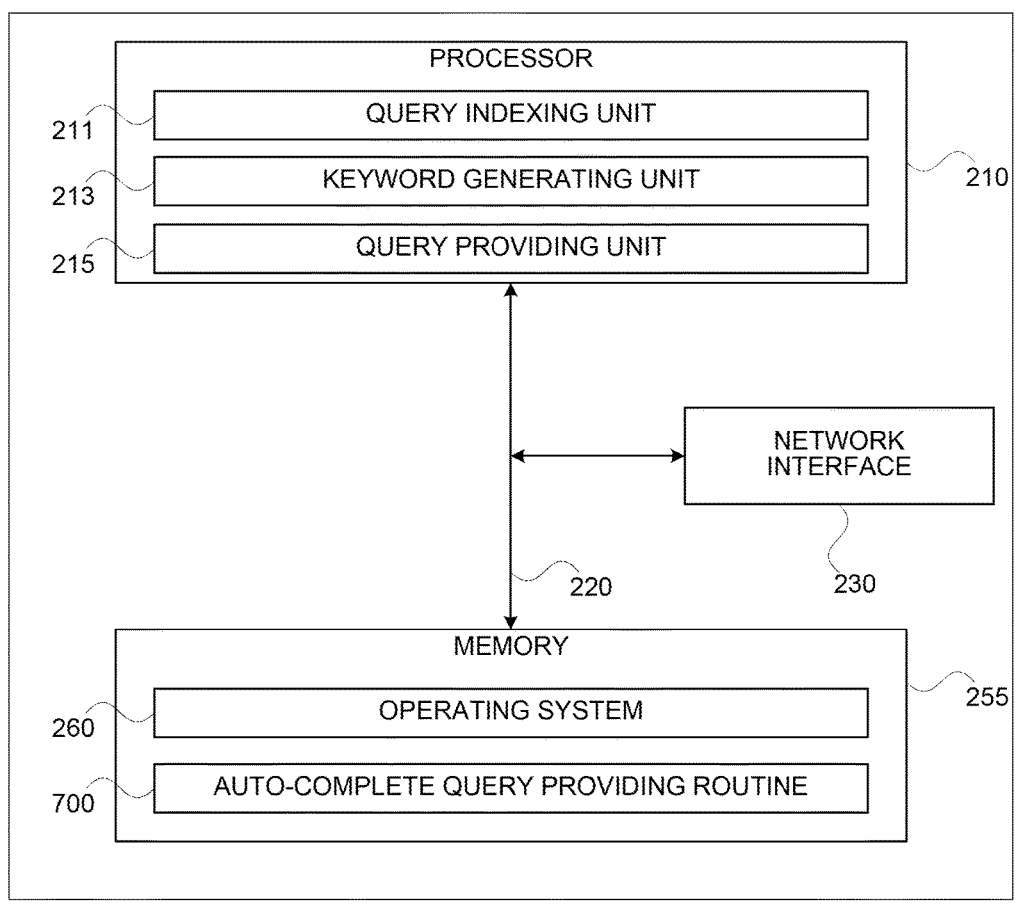
FIG. 2 is a block diagram illustrating a network device for providing a location-sensitive auto-complete query according to an example embodiment.
Figure 3:
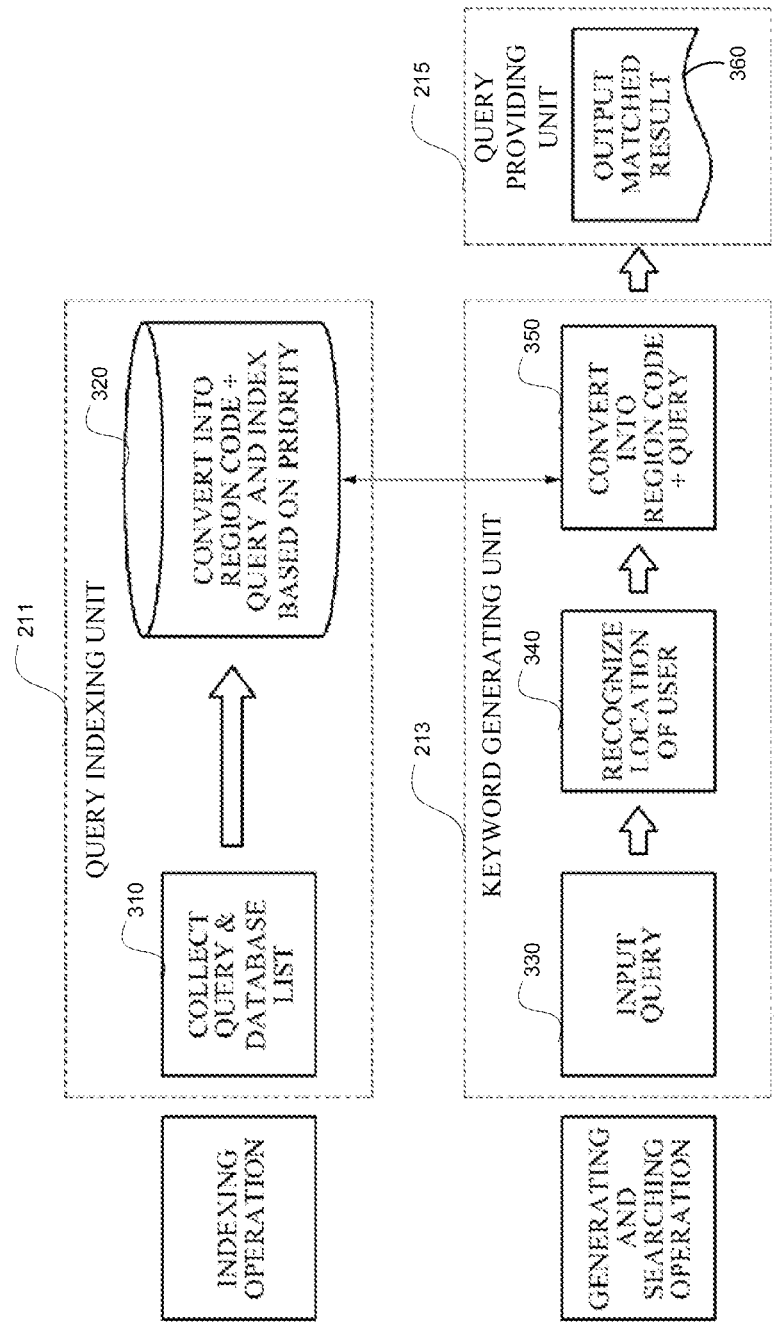
FIG. 3 is a diagram illustrating operation of a system for providing a location-based auto-complete query according to an example embodiment.

FIG. 2 is a block diagram illustrating the components of the auto-complete query system 100 according to an example embodiment. FIG. 3 is a diagram illustrating an operation of the auto-complete query system 100 according to an example embodiment. Hereinafter, the auto-complete query system 100 is described with reference to FIGS. 2-3.

As shown in FIG. 2, auto-complete query system 100 includes processor 210, bus 220, network interface 230, and memory 255. During operation, memory 255 includes operating system 260 and auto-complete query providing routine 700; and processor 210 includes query indexing unit 211, generating unit 213, and providing unit 215. In some embodiments, auto-complete query system 100 may include many more components than those shown in FIG. 2. However, it is not necessary that all of these generally conventional components be shown in order to disclose the illustrative embodiments. For example, auto-complete query system 100 may also include a display, a transceiver, and/or other like components.

Memory 255 may be a computer readable storage medium that generally includes a random access memory (RAM), read only memory (ROM), and a permanent mass storage device, such as a disk drive. Memory 255 also stores operating system 260 and program code for auto-complete query providing routine 700. These software components may also be loaded from a separate computer readable storage medium into memory 255 using a drive mechanism (not shown). Such separate computer readable storage medium may include a floppy drive, disc, tape, DVD/CD-ROM drive, memory card, or other like computer readable storage medium (not shown). In some embodiments, software components may be loaded into memory 255 via network interface 230, rather than via a computer readable storage medium.

Bus 220 enables the communication and data transfer between the components of auto-complete query system 100. Bus 220 may comprise a high-speed serial bus, parallel bus, storage area network (SAN), and/or other suitable communication technology.

Network interface 230 is a computer hardware component that connects auto-complete query system 100 to a computer network (e.g., network 105). Network interface 230 may connect auto-complete query system 100 to a computer network via a wired or wireless connection.

Processor 210 may be configured to carry out instructions of a computer program by performing the basic arithmetical, logical, and input/output operations of the system. Instructions may be provided to processor 210 by memory 255 via bus 220, or by network interface 230 via bus 220. Processor 210 is configured to execute program code for query indexing unit 211, keyword generating unit 213, and providing unit 215. Such program code may be stored in a storage device (e.g., memory 255).

The query indexing unit 211 may index search queries by incorporating location information into the search queries. As discussed above, a user may submit a search query to a search result providing service (e.g., the auto-complete query system 100 and/or a search engine) in order to obtain search results associated with the submitted search query. The query indexing unit 211 may incorporate location information associated with a current location, position, and/or region of the user terminal into the submitted search query that is input by the user. In various embodiments, the search query that is input by the user may be an auto-complete query provided to the user terminal. Thus, the query indexing unit 211 may also index provided auto-complete queries by incorporating location information associated with a current location, position, and/or region of a user terminal into the provided auto-complete queries when a user terminal submits the provided auto-complete query as a search query.

The query indexing unit 211 incorporates location information into submitted search queries and/or provided auto-complete queries submitted as search queries in order to index or otherwise catalog the submitted search queries and/or the provided auto-complete queries submitted as search queries. Furthermore, in various embodiments, the query indexing unit 211 may index or otherwise catalog the submitted search queries and/or the provided auto-complete queries submitted as search queries by incorporating information about content associated with submitted search queries and/or the provided auto-complete queries submitted as search queries. The indexed submitted search queries and/or indexed provided auto-complete queries may be stored in one or more databases (e.g., database 120). Furthermore, an index and/or catalog of the indexed submitted search queries and/or the indexed provided auto-complete queries may be stored in one or more databases (e.g., database 120).

For example, referring to FIG. 3, as shown in operation 310, the query indexing unit 211 collects search queries inputted by the user terminals 110 into the auto-complete query system 100. The collected search queries may also include auto-complete queries that were provided to the user terminals 110, which were subsequently submitted by the user terminals 110 to the auto-complete query system 100. In various embodiments, the query indexing unit 211 may classify a search query by a unit of a grapheme, a syllable, and/or a suffix by breaking down the search query into one or more substrings and/or individual characters. In various embodiments, classifying a search query may include analyzing a search query, and retrieving information that delineates how the analyzed search query is to be broken down. In such embodiments, a list of words may be referenced, where the list of words indicates one or more desired variations, permutations, and/or arrangements in which to break down a desired word. In other embodiments, classifying the search query may include analyzing a search query, and determining where a change in a speech sound is likely to occur, such as at a syllable onset, a syllable nucleus, syllable coda, vowels, consonants, white space, punctuation, and/or any other like language-related structure within a search query. For example, a search query "donkey" may be indexed by units of graphemes, such as, "d", "do", "don", "donk", "donke", and/or "donkey", and/or by units of syllables, for example, "don", "key, and/or "donkey". Also, the search query "donkey" may be indexed by suffixes, for example, "key" and "donkey".

Referring to FIG. 3, as shown in operation 320, the query indexing unit 211 converts location information of one of the user terminals 110 into a region code, and indexes a search query based on a priority. In various embodiments, the query indexing unit 211 may incorporate a region code that corresponds to location information of the user terminal into an auto-complete query, and may index the auto-complete query having the incorporated region code based on priority. A priority may be any type of indication by which a query is deemed to have a higher importance than other queries, such that queries with a higher priority are ranked and/or ordered before lower priority queries. A policy may be implemented in order to delineate how queries are to be ranked and/or ordered. For example, a priority may include a search frequency associated with a given search query and/or a search term within a search query, a bidding amount provided by an advertiser who desires to have a sponsored auto-complete query associated with a given search query and/or search term, a proximity of a user terminal submitting search query to a desired location, a time of day a search query is submitted, and/or other like information to be used for ranked and/or ordering submitted search queries.

The query indexing unit 211 may index or otherwise catalog the submitted search queries according to a region associated with the submitted search queries. In various embodiments, the location information may be used to classify the search queries in order to identify a region from which the search queries were submitted. The regions may be represented by a region code. The query indexing unit 211 may determine a region code for each of the submitted queries based on the location information associated with the user terminals that submitted the search queries, and incorporate the region code into each of the submitted queries. In example embodiments, the location information of the user terminal incorporated into the auto-complete query is not limited to the region code and may include any information used to identify a region in which a user terminal is located.

The keyword generating unit 213 may generate a keyword based on search queries inputted by the user terminals 110 and location information of the user terminals 110. Here, the location information may be inputted by the users operating the user terminals 110, or may be generated based on automatically generated location information generated by the user terminals 110. The user inputted location information may include user inputted browser information associated with a web browser installed on the user terminal, social networking information associated with a social networking application installed on the user terminal, and system information associated with a device type of the user terminal. In such embodiments, the user may set a location of the user terminal 110 in a user profile. The user profile may include demographic information, such as a gender of the user, an age of the user, a region of the user, and/or other like demographic classification information. The automatically generated location information may include GPS coordinates of the user terminals 110, browser information such as a browser cookie, an Internet Protocol (IP) address of the user terminals 110, Wi-Fi and/or Bluetooth MAC address of the user terminals 110, radio-frequency identification ("RFID") of the user terminals 110, Wi-Fi connection location information of the user terminals 110, GSM/CDMA cell IDs, and/or other like location and/or position information of the user terminals 110.

As shown in operation 330, the keyword generating unit 213 receives input information including a search query from one of the user terminals 110. In various embodiments, the keyword generating unit 213 may receive a setting mode from a web browser installed on the user terminal 110 that is submitting the search query. In such embodiments, the user may select at least one indexing method among grapheme indexing, syllable indexing, and suffix indexing, and/or may set location information of the user terminal 110.

In operation 340, the keyword generating unit 213 recognizes a location of the user terminal 110 that is submitting the search query. The keyword generating unit 213 may recognize the location of the user terminal 110 by obtaining the user inputted location information. In such embodiments, the demographic information may also be recognized or otherwise obtained. However, in various embodiments, when the user fails to set location information of the user terminal 110, the keyword generating unit 213 may recognize location information of the user terminal 110 based on the automatically generated location information of the user terminal 110.

As shown in operation 350, the keyword generating unit 213 converts the recognized location into a region code and incorporates the region code into a generated keyword. A region may include a geographic, political, and/or any other like physically divided area that is encompassed by a boundary. Additionally, a region may also include "demographic regions", which is a region having a size, structure, and/or distribution defined according to one or more demographic characteristics. Demographic regions may also be associated with a geographic and/or physical area where the size, structure, and/or distribution of the geographic and/or physical area is based on one or more demographic characteristics. Demographic characteristics may include age, gender, nationality, ethnicity, religion, education level, occupation, social class, and/or other like demographic information. Thus, in various embodiments, the region code may include the recognized and/or obtained demographic information.

A region code may be a character or symbol that represents a given physical and/or demographic region. A region code may be any number of and combination of characters, including digits, letters, symbols, and the like. In various embodiments, a region code may include one or more characters that represent a geographic and/or physical region, as well as one or more characters that represent a demographic region.

When the location information of the user is recognized, the keyword generating unit 213 may incorporate a region code corresponding to the location information into the inputted search query to generate a keyword for searching for a location-sensitive and/or location-based auto-complete query from among the indexed queries stored in the query indexing unit 211. For example, when a search query "terminal" is inputted by a user located in the city of Seoul, the keyword generating unit 213 may generate a keyword "01_terminal" by incorporating a region code for Seoul "01".

Additionally, as discussed above, a region code may represent a demographic region. In various embodiments, a region code may also include one or more characters that indicate demographic classification information in addition to one or more characters that represents a physical region. For example, when a search query "terminal" is inputted by a male user who has a birthday of Jan. 1, 1990, who is located in the city of Seoul, the keyword generating unit 213 may generate a keyword "01M1990_terminal" by incorporating a region code of "01" for Seoul, "M" for male, and "1990" for the year of the user's birth. It should be noted that a location and/or position of a given character within the region code may indicate a given location or demographic information.

It should be noted that, because the keyword generating unit 213 generates a keyword that incorporates location information, such as a region code, into a search query, the query indexing unit 211 may index keywords that were generated for previously provided auto-complete queries, which were submitted as search queries. That is, after the keyword generating unit 213 generates a keyword by incorporating location information, such as a region code, into a search query, in various embodiments, the query indexing unit 211 may index the generated keyword.

Because the keyword generating unit 213 generates a keyword that incorporates location information, such as a region code, into a search query, the query indexing unit 211 may index previously submitted search queries based on location information, and the query providing unit 215 may retrieve or otherwise obtain a previously submitted search query. The query providing unit 215 may provide the user terminal 110 with the previously provided auto-complete query corresponding to the keyword generated by the keyword generating unit 213 from among the auto-complete queries indexed by the query indexing unit 211. The query providing unit 215 may search for the previously submitted search query to a user in response to a currently submitted portion of a search query.

For example, the query providing unit 215 may search for a previously provided auto-complete query that matches a keyword having an incorporated region code that has been generated by the keyword generating unit 213 from among a plurality of auto-complete queries indexed by the query indexing unit 211. The query providing unit 215 may compare a currently input a search query with the region codes of the indexed search queries in order to determine a matching keyword. When one or more of the indexed search queries are determined to match the currently inputted search query, the one or more indexed search queries may be provided to the user terminal 110 that is currently inputting the search query. It should be noted that in various embodiments, the indexed search queries may include previously provided auto-complete search queries that were submitted by one or more user terminals. In such embodiments, the query providing unit 215 may provide the indexed previously provided auto-complete search queries that are determined to match the currently inputted search query.

As shown in operation 360, the query providing unit 215 may output a desired (or alternatively, "predetermined") number of the indexed search queries and/or the previously provided auto-complete queries at the bottom of a search window of a web browser. In this case, the query providing unit 215 may determine the ranks of the indexed search queries and/or the previously provided auto-complete queries to be outputted, based on, for example, a search frequency, a proximity to a location of the user terminal 110, a time of day that the search queries were submitted, a bidding amount for one or more keywords contained in the search queries, and/or any other like ranking criteria.

Further, although not shown, in various embodiments, the query providing unit 215 may provide the keyword generated by the keyword generating unit 213 to a separate information provider that classifies the query by region. The query providing unit 215 may then receive a query corresponding to the keyword from the separate information provider and provide the user with the query, or may receive the query classified by region from the information provider and provide the user with a query matched to the keyword. By way of example, the separate information provider may be a third-party search engine and/or other like a third-party search engine and/or other like search result data provider.

FIG. 4 is a diagram illustrating an example of auto-complete queries indexed by the auto-complete query system 100 according to an example embodiment.

As discussed above, the query indexing unit 211 may index an auto-complete query by incorporating a region code into the submitted search queries and/or previously provided auto-complete queries. Also, the query indexing unit 211 may classify the submitted search queries and/or the previously provided auto-complete queries in units of graphemes, syllables, and/or suffixes, and as shown in FIG. 4, the query indexing unit 211 may index or otherwise organize the submitted search queries and/or the previously provided auto-complete queries in a descending order based on a priority, such as, in an order of search frequency, an order of a bidding amount, a proximity to a desired location where a query was submitted, a time of day a query is submitted, and/or other like information to be used for ranked and/or ordering search queries. In some embodiments, the query indexing unit 211 may index or otherwise organize the submitted search queries and/or the previously provided auto-complete queries in an ascending order or other like sequence based on one or more priorities.

In FIG. 4, classification by the unit of a grapheme and search frequency-based indexing for an auto-complete query is illustrated as an example. In the example illustrated by FIG. 4, it is assumed that a region code '01' represents the city of Seoul and a region code '02' indicates the provincial area of Gyeonggi Province. When a user located in Seoul inputs 'a' as a query, the keyword generating unit 213 may convert the query 'a' into a keyword '01_a'. Using the keyword, the query providing unit 215 may provide auto-complete queries 'apple', 'area', and the like as a location-sensitive and/or location-based auto-complete query from among the indexed submitted search queries and/or previously provided auto-complete queries. In this example, the query providing unit 215 may output a desired (or alternatively, "predetermined") number of auto-complete queries by region in a descending order according to a search frequency at a bottom of a search window of a web browser. As another example, when a user located in Gyeonggi Province inputs 'a' as a query, the keyword generating unit 213 may convert the query 'a' into a keyword '02_a'. In this example, since 'aerobic' has a high search frequency, the query providing unit 215 may provide the user with 'aerobic' as a location-based auto-complete query. Accordingly, the system for providing a location-based auto-complete query according to example embodiments may provide the user with a location-based auto-complete query.

Figure 5:
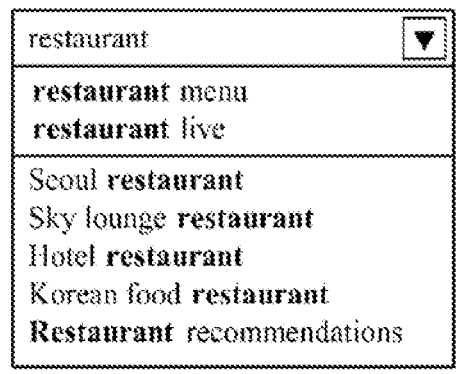
FIG. 5 is a diagram illustrating examples of auto-complete queries provided when a user is located in a city according to an example embodiment.
Figure 6:
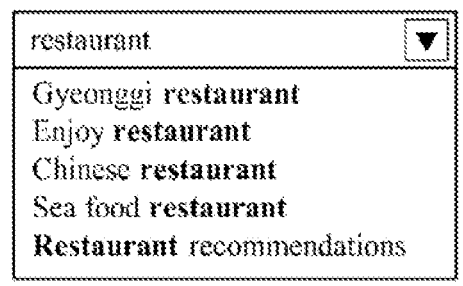
FIG. 6 is a diagram illustrating examples of auto-complete queries provided when a user is located in a provincial area according to an example embodiment.

FIG. 5 is a diagram illustrating an example of auto-complete queries provided when a user is located in a city according to an example embodiment. FIG. 6 is a diagram illustrating an example of auto-complete queries provided when a user is located in a provincial area according to an example embodiment. The auto-complete query provided according to example embodiments is described herein with reference to FIGS. 5-6.

When a user who is located in a city such as Seoul, or selects Seoul as the user's location information, and the user inputs a query "restaurant", the auto-complete query system

100 may provide the user with auto-complete queries for "restaurant" located in Seoul as shown in FIG. 5. When a user who is located in a provincial area such as Gyeonggi Province or selects Gyeonggi Province as location information of the user inputs a query "restaurant", the auto-complete query system 100 may provide the user with auto-complete queries for "restaurant" located in Gyeonggi Province as shown in FIG. 6. Accordingly, when a user desires to find a restaurant closest to a current location of the user, even though the user inputs a portion of a search query, such as an improper and/or insufficient search query, the auto-complete query system 100 may automatically complete a query suitable for the user and may provide the user with the location-based auto-complete query. Thus, the user may obtain a satisfactory search result using a query of interest or a query determined to be suitable among indexed submitted search queries and/or previously provided auto-complete queries provided through the auto-complete query system 100.

Although FIGS. 5-6 show a region classified by a city and a province, for example, Seoul and Gyeonggi Province, the auto-complete query system 100, according to various embodiments, may provide an auto-complete query by a district, for example, "Gangnam-gu", "Seocho-gu", and the like, and may further provide an auto-complete query by a town such as, for example, "Cheongdam-dong", "Nonhyeon-dong", and the like. Additionally, according to various embodiments, the auto-complete query system 100 may provide an auto-complete query by other regions including demographic regions, such as by age, gender, nationality, ethnicity, religion, education level, occupation, social class, and/or other like demographic regions. Furthermore, in various embodiments, the auto-complete query system 100 may provide a desired number of auto-complete queries based on a range of regions. Such ranges of regions may include one or more geographic and/or political regions that are proximate to a user terminal's current location and/or position (e.g., providing one or more auto-complete queries for "Seocho-gu", "Gangnam-gu", and "Songpa-gu" when a user terminal is located in "Gangnam-gu"), one or more demographic regions that are within a desired demographic range and/or within a desired demographic group (e.g., male users between the ages of 18-35), and/or other like ranges.

The auto-complete query system 100, according to example embodiments, may display a location-based auto-complete query in a descending order or other like sequence based on a desired priority when providing a user with the location-based auto-complete query. Also, the auto-complete query system 100, according to example embodiments, may provide a general auto-complete query irrespective of the location of the user in a predetermined portion of an auto-complete query output area as well as providing a location-based auto-complete query.

FIG. 7 is a flowchart illustrating an auto-complete query providing routine 700 for providing a location-based auto-complete query according to an example embodiment. For illustrative purposes, the operations of the auto-complete query providing routine 700 will be described as being performed by the auto-complete query system 100 as described above with respect to FIGS. 1-3. However, it should be noted that other similar network devices may operate the auto-complete query providing routine 700 as described below.

In operation S710, when a user inputs a query, the auto-complete query system 100 indexes search queries by incorporating location information of the user terminal into the search queries. In various embodiments, the search queries may be auto-complete queries that were provided to one or more users, which are then submitted to the auto-complete query system 100 as a search query. The search queries may be collected according to one or more regions of user terminals that submit the search queries. Indexing the auto-complete query may include classifying the auto-complete query by units of graphemes, syllables, or suffixes. The auto-complete query may be indexed based on one or more priorities, such as, in order of a search frequency, a bidding amount, a proximity to a desired location where a query was submitted, a time of day a query is submitted, and/or other like information to be used for ranked and/or ordering search queries. The location information may be manually set by the user through the user terminal on, for example, user inputted browser information of a web browser installed on the user terminal (e.g., browser personalization information and the like), social networking information associated with a social networking application installed on the user terminal, system information associated with a device type of the user terminal, and the like. In such embodiments, if the user manually enters his desired location the auto-complete query system 100 will return search results based on the user-inputted location information. Otherwise, the auto-complete query system 100 may determine the location information of the user terminal by collecting or otherwise obtaining automatically generated location and/or position data from a GPS coordinate, automatically generated browser information (e.g., browser cookies and the like), an IP address, Wi-Fi and/or Bluetooth MAC address, radio-frequency identification ("RFID"), Wi-Fi connection location, GSM/CDMA cell IDs, and the like.

Subsequently, the indexed search queries and/or previously provided auto-complete queries may be stored in one or more databases that are associated with the auto-complete query system 100 (e.g., database 120). Once stored, the indexed search queries and/or previously provided auto-complete queries may be accessed in order to provide auto-complete queries to other user terminals based on a region and/or location of the other user terminals.

In operation S720, the auto-complete query system 100 recognizes location information of a user terminal that is currently accessing the auto-complete query system 100. When a user terminal accesses the auto-complete query system 100, the auto-complete query system 100 may recognize location information of the user terminal using location information that is inputted from the user terminal, or using automatically generated location information for identifying the user terminal, as described with reference to operation S710.

When the location information of the user terminal is recognized, in operation S730, the auto-complete query system 100 generates a keyword for searching for a location-based auto-complete query to be provided to the user. The auto-complete query system 100 uses at least a portion of the query inputted from the user terminal and the recognized location information of the user terminal in order to search for and obtain an indexed auto-complete query. The auto-complete query system 100 may compare the location information of the user terminal inputting the search query with the indexed search queries and/or previously provided auto-complete queries in order to determine matching ones of the indexed search queries and/or previously provided auto-complete queries. In various embodiments, in order to find matching ones of the indexed search queries and/or previously provided auto-complete queries, the auto-complete query system 100 generates a keyword by incorporating location information of the user terminal into the inputted search query. The generated keyword may then be compared with the indexed search queries and/or previously provided auto-complete queries.

In operation S740, the auto-complete query system 100 provides an auto-complete query to the user terminal. As discussed above, the auto-complete query system 100 may compare a generated keyword having incorporated location information with the indexed search queries and/or previously provided auto-complete queries. The auto-complete query system 100 may extract or otherwise obtain a matching one from the indexed search queries and/or previously provided auto-complete queries, and may provide the matching indexed search queries and/or previously provided auto-complete queries to the user terminal as a location-based and/or location-sensitive auto-complete query. In various embodiments, a desired number of matching ones of the indexed search queries and/or previously provided auto-complete queries may be provided to the user terminal based on one or more priorities. Additionally, in various embodiments, the matching ones of the indexed search queries and/or previously provided auto-complete queries may be provided to the user terminal in a search window or other like text input field in which the user is currently inputting text.

Accordingly, the system and method for providing an location-based auto-complete query according to example embodiments may provide an auto-complete query in real time based on a region in which a user is located using location information of a user terminal when the user inputs a query into a search window of a web page, and may provide a location-based auto-complete query with one system for providing an auto-complete query.

The method for providing a location-based auto-complete query according to example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM discs and DVD; magneto-optical media such as floppy discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments.

According to example embodiments, an auto-complete query may be provided based on a region in which a user is located, by incorporating location information into auto-complete queries to index the auto-complete queries and providing an auto-complete query using location information of a user terminal when the user inputs a query. According to the example embodiments, a location-sensitive auto-complete query may be provided using one system for providing an auto-complete query, thereby reducing the costs involved in construction of the system.

It will be apparent to those skilled in the art that various modifications and variation can be made to the example embodiments without departing from the spirit or scope of the present disclosure. Thus, it is intended that the example embodiments cover modifications and variations of example embodiments provided they come within the scope of the appended claims and their equivalents.

What is claimed:

1. A system for providing at least one auto-complete query to a user terminal, the system comprising:
 a memory having computer readable instructions stored thereon; and
 at least one processor configured to execute the computer readable instructions to,
  receive a partial search query from a user terminal,
  index the received partial search query, the received partial search query being associated with location information,
  the location information associated with a region code representing a physical region and a demographic region, the demographic region including at least two of age, gender, ethnicity, religion, education level, and occupation characteristics for a group of users in the physical region,
  the indexing including incorporating the location information into the received partial search query, and analyzing the received partial search query in accordance with a desired indexing mode,
  generate a keyword based on results of the analyzing the received partial search query and the location information,
  determine that at least one of a plurality of previously indexed search query corresponds to the generated keyword and the location information, the plurality of previously indexed search queries including at least one previously provided auto-complete query,
  determine at least one non-local auto-complete query associated with at least one physical region that is different than the physical region associated with the location information, the determined non-local auto-complete query being associated with the demographic region of the location information, and
  provide, to the user terminal, the determined at least one of the plurality of previously indexed search queries and the determined at least one non-local auto-complete query as the at least one auto-complete query.

2. The system of claim 1, wherein the desired indexing mode includes at least one of a grapheme indexing mode, syllable indexing mode, and suffix indexing mode.

3. The system of claim 1, wherein
 the location information includes at least one of user inputted location information and automatically generated location information;
 the user inputted location information includes at least one of user inputted browser information associated with a web browser installed on the user terminal, social networking information associated with a social networking application installed on the user terminal, and system information associated with a device type of the user terminal; and
 the automatically generated location information includes at least one of an automatically generated browser information, an IP address, a Bluetooth MAC address, a radio-frequency identification ("RFID"), and a Wi-Fi connection location.

4. The system of claim 1, wherein the at least one processor is further configured to:
- index the provided at least one auto-complete query when the user terminal submits the provided at least one auto-complete query as a search query by incorporating location information associated with a current position of the user terminal into the provided at least one auto-complete query.

5. The system of claim 1, wherein
- the indexing including incorporating the location information into the received partial search query further includes incorporating priority information into the received partial search query, the priority information associated with a bid amount related to the partial search query; and
- the determining further includes determining that at least one of a plurality of previously indexed search query corresponds to the generated keyword and the location information based on the priority information.

6. The system of claim 5, wherein the at least one processor is further configured to:
- generate the keyword by incorporating the region code corresponding to the location information associated with a current position of the user terminal into the query inputted by the user terminal.

7. The system of claim 5, wherein
- the physical region being an area defined by at least one of a geographic boundary and a political boundary.

8. The system of claim 5, wherein the priority information is at least one priority ranking associated with each of the previously indexed search queries.

9. The system of claim 8, wherein the at least one priority ranking includes at least one of a search frequency of the determined at least one of the plurality of previously indexed search queries, a bidding amount associated with the determined at least one of the plurality of previously indexed search queries, a proximity to a desired location of the determined at least one of the plurality of previously indexed search queries, and a time of day that the determined at least one of the plurality of previously indexed search queries was submitted as a search query.

10. A method for providing at least one auto-complete query to a user terminal in response to a query inputted by the user terminal, the method comprising:
- receiving, using at least one processor, a partial search query from a user terminal;
- indexing, using the at least one processor, the received partial search query, the received partial search query being associated with location information,
  - the location information associated with a region code representing a physical region and a demographic region, the demographic region including at least two of age, gender, ethnicity, religion, education level, and occupation characteristics for a group of users in the physical region,
  - the indexing including incorporating the location information into the received partial search query, and analyzing the received partial search query in accordance with a desired indexing mode;
- generating, using the at least one processor, a keyword based on results of the analyzing the received partial search query and the location information;
- determining, using the at least one processor, that at least one of a plurality of previously indexed search query corresponds to the generated keyword and the location information, the plurality of previously indexed search queries including at least one previously provided auto-complete query;
- determining, using the at least one processor, at least one non-local auto-complete query associated with at least one physical region that is different than the physical region associated with the location information, the determined non-local auto-complete query being associated with the demographic region of the location information; and
- providing, using the at least one processor, to the user terminal the determined at least one of the plurality of previously indexed search queries and the determined at least one non-local auto-complete query as the at least one auto-complete query.

11. The method of claim 10, wherein the desired indexing mode includes at least one of a grapheme indexing mode, syllable indexing mode, and suffix indexing mode.

12. The method of claim 10, wherein,
- the location information includes at least one of user inputted location information and automatically generated location information;
- the user inputted location information includes at least one of user inputted browser information associated with a web browser installed on the user terminal, social networking information associated with a social networking application installed on the user terminal, and system information associated with a device type of the user terminal; and
- the automatically generated location information includes at least one of an automatically generated browser information, an IP address, a Bluetooth MAC address, a radio-frequency identification ("RFID"), and Wi-Fi connection location.

13. The method of claim 10, wherein the indexing comprises:
- indexing the provided at least one auto-complete query when the user terminal submits the provided at least one auto-complete query as a search query by incorporating location information associated with a current position of the user terminal into the provided at least one auto-complete query.

14. The method of claim 10, wherein
- the indexing including incorporating the location information into the received partial search query further includes incorporating priority information into the received partial search query, the priority information associated with a bid amount related to the partial search query; and
- the determining further includes determining that at least one of a plurality of previously indexed search query corresponds to the generated keyword and the location information based on the priority information.

15. The method of claim 12, wherein the generating comprises:
- generating the keyword by incorporating the region code corresponding to the location information associated with a current position of the user terminal into the query inputted query by the user terminal.

16. The method of claim 14, wherein
- the physical region is an area defined by at least one of a geographic boundary and a political boundary.

17. The method of claim 14, wherein the priority information is at least one priority ranking associated with each of the previously indexed search queries.

18. The method of claim 17, wherein the at least one priority ranking includes at least one of a search frequency of the determined at least one of the plurality of previously indexed search queries, a bidding amount associated with the determined at least one of the plurality of previously indexed search queries, a proximity to a desired location of the determined at least one of the plurality of previously indexed search queries, and a time of day that the determined at least one of the plurality of previously indexed search queries was submitted as a search query.

19. A non-transitory computer-readable medium including computer readable instructions, which when executed by at least one processor, causes the at least one processor to:
receive a partial search query from a user terminal;
index the received partial search query, the received partial search query being associated with location information,
the location information associated with a region code representing a physical region and a demographic region, the demographic region including at least two of age, gender, ethnicity, religion, education level, and occupation characteristics for a group of users in the physical region,
the indexing including incorporating the location information into the received partial search query, and analyzing the received partial search query in accordance with a desired indexing mode;
generate a keyword based on results of the analyzing the search query and the location information;
determine that at least one of the plurality of previously indexed search queries search queries corresponds to the generated keyword and the location information, the plurality of previously indexed search queries including at least one previously provided auto-complete query;
determine at least one non-local auto-complete query associated with at least one physical region that is different than the physical region associated with the location information, the determined non-local auto-complete query being associated with the demographic region of the location information, and
provide to the user terminal the determined at least one of the plurality of previously indexed search queries and the determined at least one non-local auto-complete query as auto-complete queries.

20. The system of claim 8, wherein the at least one priority ranking includes a bidding amount for an advertisement associated with the determined at least one of the plurality of previously indexed search queries.

* * * * *